(12) United States Patent
Lim

(10) Patent No.: US 11,332,091 B2
(45) Date of Patent: May 17, 2022

(54) LIFE PROTECTION DEVICE SYSTEM

(71) Applicant: Sang Jin Lim, Seoul (KR)

(72) Inventor: Sang Jin Lim, Seoul (KR)

( * ) Notice: Subject to any disclaimer, the term of this patent is extended or adjusted under 35 U.S.C. 154(b) by 50 days.

(21) Appl. No.: 16/984,683

(22) Filed: Aug. 4, 2020

(65) Prior Publication Data

US 2021/0268981 A1 Sep. 2, 2021

(30) Foreign Application Priority Data

Feb. 28, 2020 (KR) .......................... 10-2020-0025366

(51) Int. Cl.
| | | |
|---|---|---|
| *B60R 21/16* | (2006.01) | |
| *B60R 21/01* | (2006.01) | |
| *B60R 21/203* | (2006.01) | |
| *B60R 21/214* | (2011.01) | |
| *B60R 21/00* | (2006.01) | |

(52) U.S. Cl.
CPC ............ *B60R 21/01* (2013.01); *B60R 21/203* (2013.01); *B60R 21/214* (2013.01); *B60R 2021/0016* (2013.01); *B60R 2021/0027* (2013.01); *B60R 2021/0093* (2013.01)

(58) Field of Classification Search
CPC ............ B60W 60/0017; B60R 21/203; B60R 21/214; B60R 2021/0016; B60R 2021/0027; B60R 2021/0093; B60R 2021/23107
See application file for complete search history.

(56) References Cited

U.S. PATENT DOCUMENTS

| | | | | |
|---|---|---|---|---|
| 5,845,593 | A * | 12/1998 | Birkestrand | B63H 16/12 114/39.11 |
| 10,150,392 | B2 * | 12/2018 | Mani | B60N 2/42736 |
| 10,160,301 | B2 * | 12/2018 | Perlo | B62D 23/005 |
| 2018/0370472 | A1 * | 12/2018 | Belwafa | B60R 21/0136 |
| 2019/0258253 | A1 * | 8/2019 | Tremblay | G01C 21/3415 |
| 2019/0356552 | A1 * | 11/2019 | Ricci | G08G 1/09 |
| 2020/0207371 | A1 * | 7/2020 | Dougherty | B60W 60/0017 |

* cited by examiner

*Primary Examiner* — James A English
(74) *Attorney, Agent, or Firm* — STIP Law Group, LLC

(57) ABSTRACT

A life protection device system is proposed. More particularly, the life protection device system includes: a shock absorbing device provided with a shock absorbing part, a shock absorber, and an airbag that are mounted on a moving object so as to absorb impact to protect the life of passengers in a crash or collision of the moving object; a measuring device detecting the shock applied to the moving object; a controller generating a preset driving control signal according to the detected shock of the measuring device; and an artificial intelligence part notifying of an occurrence of a disaster and asking for help from a designated disaster center in response to the driving control signal of the controller, wherein the impact on the passengers is minimized even when the moving object such as a drone, autonomous aircraft, and autonomous vehicle crashes or collides, or falls into a river or sea.

5 Claims, 6 Drawing Sheets

LIFE PROTECTION DEVICE SYSTEM

CROSS REFERENCE TO RELATED APPLICATION

The present application claims priority to Korean Patent Application No. 10-2020-0025366, filed Feb. 28, 2020, the entire contents of which is incorporated herein for all purposes by this reference.

BACKGROUND OF THE INVENTION

Field of the Invention

The present invention relates to a life protection device system and, more particularly, to a life protection device system that may protect the life of passengers in the event of an emergency situation, by minimizing impact on the passengers even when a moving object such as a drone, an autonomous aircraft, or an autonomous vehicle crashes or collides, or falls into a river or sea.

Description of the Related Art

In general, a vehicle is used as a means for transporting people as well as a means for transporting things, and such a vehicle is equipped with an airbag for absorbing a crash impact on passengers and protecting the passengers in the event of a crash or collision of the vehicle.

Meanwhile, with the rapid development of technology, a future vehicle is developed as a drone, an autonomous aircraft, or an autonomous vehicle. However, in reality, a moving object such as the drone, the autonomous aircraft, and the autonomous vehicle is being developed with an emphasis only on aspects wherein the autonomous moving object obtains information about an estimated route for autonomous driving by performing wireless transmission and reception with surrounding autonomous moving objects, and wherein, by comparing the obtained information, the autonomous moving object decides a driving route by itself through artificial intelligence, so as to drive along the route.

When the moving object such as the drone, the autonomous aircraft, or the autonomous vehicle crashes or collides, or falls into a river or sea, protection of the life of passengers by a conventional airbag or parachute in the event of an emergency situation is unsatisfactory, and in case where the time is insufficient for the parachute to be deployed, the moving object ends up sinking into the water. Therefore, there is a problem in that the life of the passengers may not be protected.

SUMMARY OF THE INVENTION

The present invention has been proposed to solve the above problems of previously proposed methods, and the objective of the present invention is to provide a life protection device system that includes: a shock absorbing device provided with a shock absorbing part, a shock absorber, and an airbag that are mounted on a moving object so as to absorb impact to protect the life of passengers in the event of a crash or collision of the moving object; a measuring device detecting shock applied to the moving object; a controller generating a preset driving control signal according to the detected shock of the measuring device; and an artificial intelligence part notifying of an occurrence of a disaster and asking for help from a designated disaster center in response to the driving control signal of the controller, wherein the impact on the passengers of the moving object is minimized even when the moving object such as a drone, an autonomous aircraft, and an autonomous vehicle crashes or collides, or falls into a river or sea, thereby protecting the life of the passengers in the emergency situation.

In addition, another objective of the present invention is to provide a life protection device system, wherein, by mounting a shock absorbing device including a shock absorbing part, shock absorber, airbag, and others on a moving object for autonomous driving, injury of passengers is minimized through performing systematic and comprehensive step-by-step shock absorption even when the moving object crashes or collides, or falls into a river or sea; a notification is sent simultaneously to ask for help from a designated disaster center in the event of the emergency situation; and accordingly emergency rescue is performed.

According to a feature of the present invention for achieving the above objective, a life protection device system 10 includes: a shock absorbing device 100 provided with a shock absorbing part 110, a shock absorber 120, and an airbag 130 that are mounted on a moving object so as to absorb impact to protect the life of passengers in an event of a crash or a collision of the moving object; a measuring device 200 detecting a shock applied to the moving object; a controller 300 generating a preset driving control signal according to the detected shock of the measuring device 200; and an artificial intelligence part 400 notifying of an occurrence of a disaster and asking for help from a designated disaster center in response to the driving control signal of the controller 300.

Preferably, the moving object may be one selected from a drone, an autonomous aircraft, and an autonomous vehicle.

More preferably, the shock absorbing part 110 of the shock absorbing device 100 may include: a first shock absorbing part 111 mounted on a wheel support and a front bumper (not shown) of the moving object; a second shock absorbing part 112 mounted on a side and a floor of the moving object; and a third shock absorbing part 113 mounted on a roof top of the moving object.

Even more preferably, the second shock absorbing part 112 may perform a function as an air tube that may allow the moving object to float with buoyancy when the moving object falls on the surface of a river or sea.

More preferably, the shock absorber 120 of the shock absorbing device 100 may include: a first shock absorber 121 mounted to absorb a shock between a floor of the moving object and a wheel support thereof or between the floor of the moving object and a front bumper (not shown) thereof; and a second shock absorber 122 mounted to absorb a shock between the floor of the moving object and a seat thereof.

More preferably, the airbag 130 of the shock absorbing device 100 may include: a first airbag 131 mounted on a framework of a seat of the moving object; and a second airbag 132 mounted at a position on a front and upper part of the seat of the moving object.

More preferably, the first airbag 131 may be operated depending on the driving control signal generated by the controller 300 when the measuring device 200 detects a preset number of times the shock is applied to the moving object.

More preferably, the artificial intelligence part 400 may control autonomous driving or autonomous flight through a function of mutually avoiding a collision between the moving objects including the drone, the autonomous aircraft, and the autonomous vehicle.

According to the life protection device system proposed by the present invention, the life protection device system includes: a shock absorbing device provided with a shock absorbing part, a shock absorber, and an airbag that are mounted on a moving object so as to absorb the impact to protect the life of passengers in the event of a crash or collision of the moving object; a measuring device detecting shock applied to the moving object; a controller generating a preset driving control signal according to the detected shock of the measuring device; and an artificial intelligence part notifying of an occurrence of a disaster and asking for help from a designated disaster center in response to the driving control signal of the controller, wherein the impact on the passengers of the moving object is minimized even when the moving object such as a drone, an autonomous aircraft, and an autonomous vehicle crashes or collides, or falls into a river or sea, thereby protecting the life of the passengers in the emergency situation.

In addition, according to the life protection device system of the present invention, by mounting the shock absorbing device including the shock absorbing part, shock absorber, airbag, and others on the moving object for autonomous driving, injury of the passengers is minimized through performing systematic and comprehensive step-by-step shock absorption even when the moving object crashes or collides, or falls into a river or sea; a notification is sent simultaneously to ask for help from a disaster center in the event of the emergency situation; and accordingly emergency rescue is performed.

DETAILED DESCRIPTION OF THE INVENTION

Figure 1:
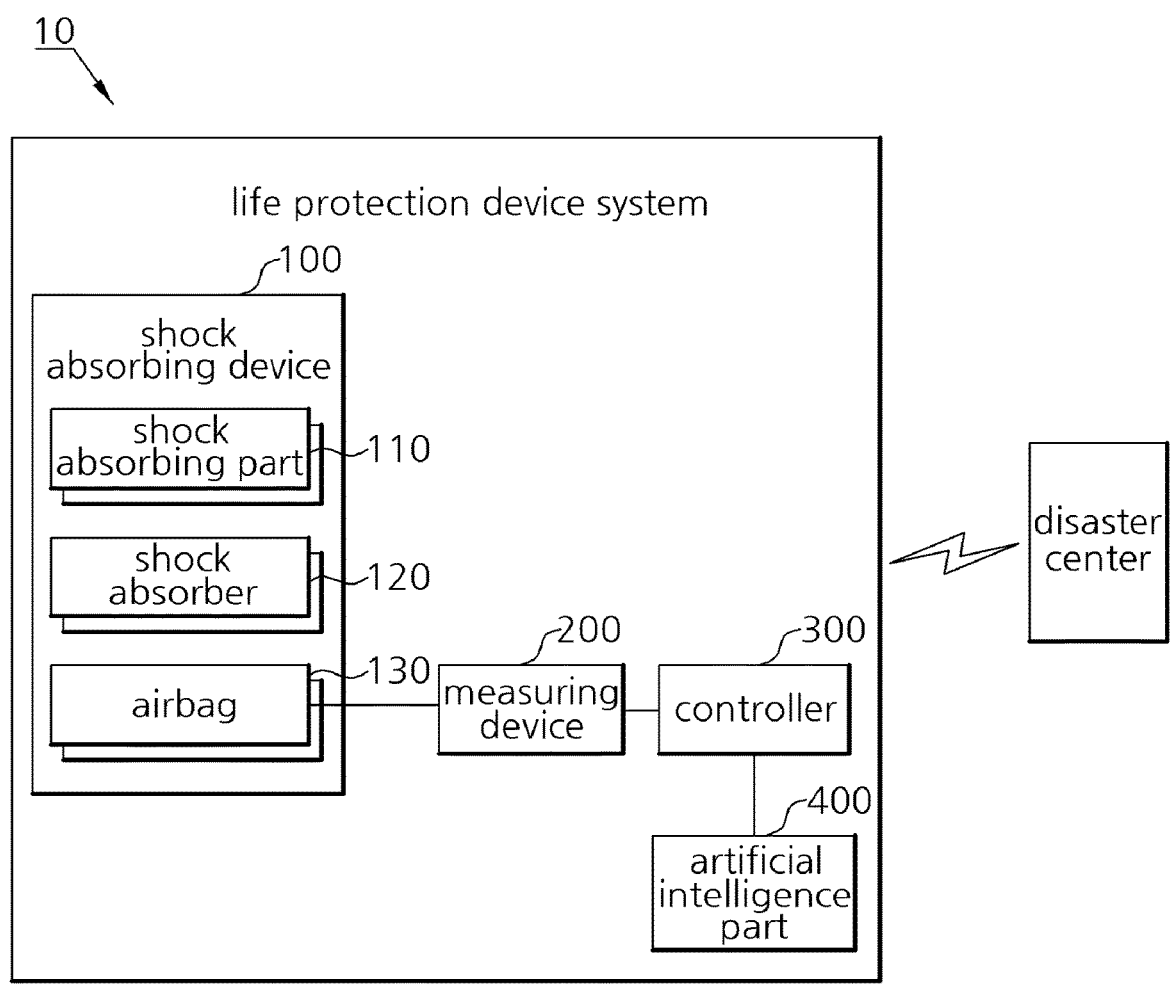
FIG. 1 is a functional block diagram showing a configuration of a life protection device system according to an exemplary embodiment of the present invention.

Hereinafter, preferred exemplary embodiments will be described in detail with reference to the drawings accompanied in this specification so that those skilled in the art may easily implement the present invention. However, in the following detailed description of the preferred exemplary embodiment of the present invention, it is to be noted that, when the detailed description of a related known function or configuration may unnecessarily obscure the subject matter of the present invention, the detailed description thereof will be omitted. In addition, the same reference numerals are used throughout the drawings for parts having similar functions and actions.

In addition, throughout the specification, when a part is said to be "connected" to another part, an expression such as "connected" includes not only "directly connected", but also "indirectly connected" having a different component in the middle. In addition, unless the context clearly indicates otherwise, it will be further understood that the terms "comprises", "comprising", "includes", and/or "including" specify the presence of other components, but do not preclude the presence or addition of one or more other components thereof.

Figure 2:
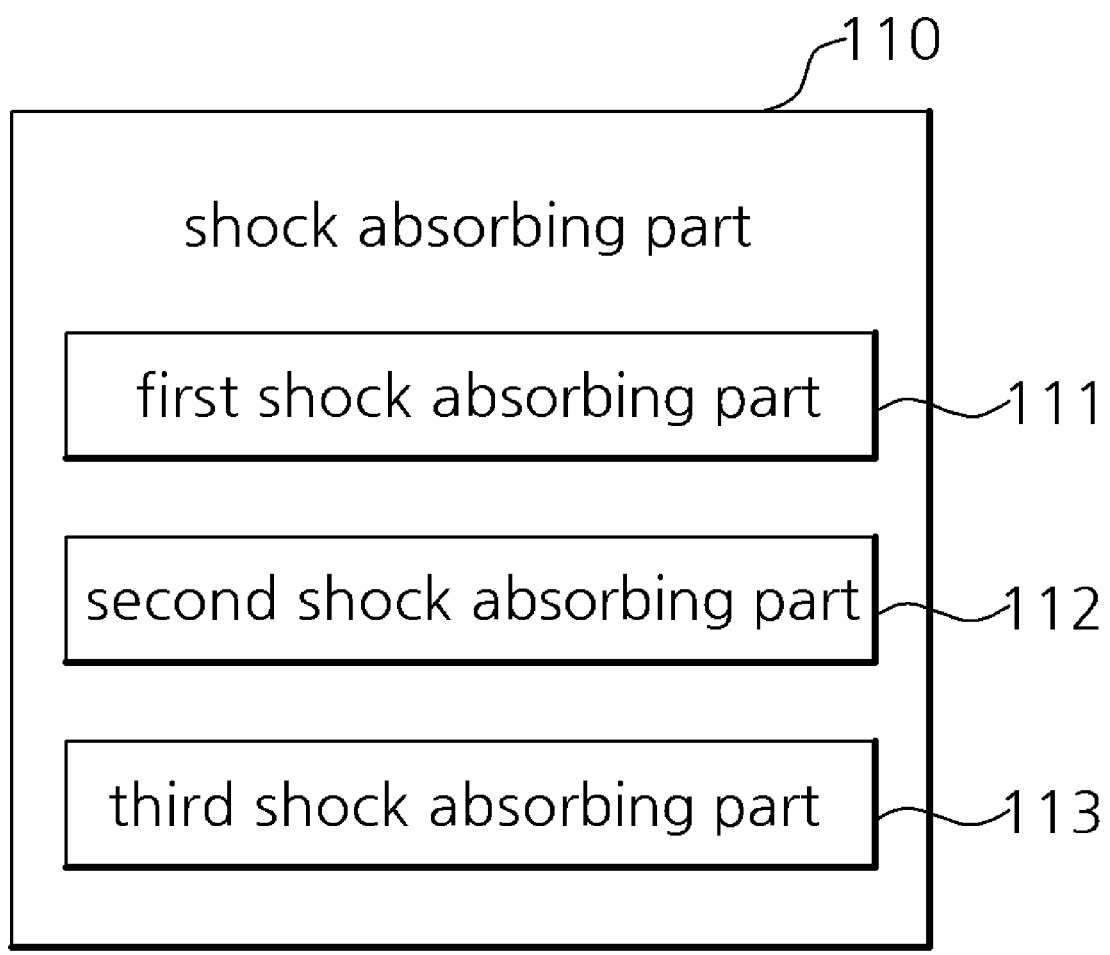
FIG. 2 is a functional block diagram showing a configuration of a shock absorbing part of the life protection device system according to the exemplary embodiment of the present invention.
Figure 3:
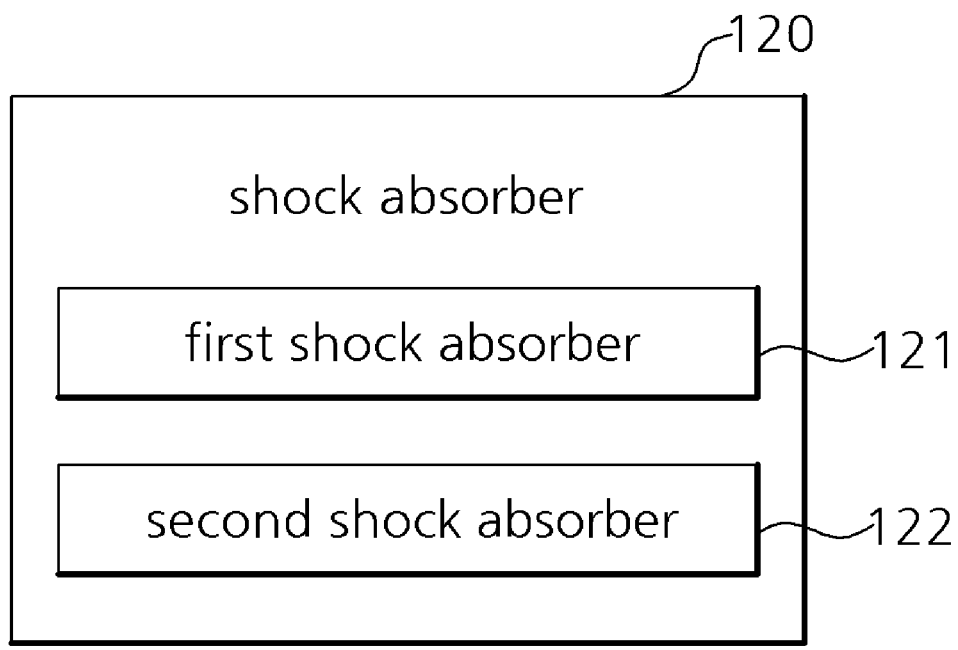
FIG. 3 is a functional block diagram showing a configuration of a shock absorber of the life protection device system according to the exemplary embodiment of the present invention.
Figure 4:
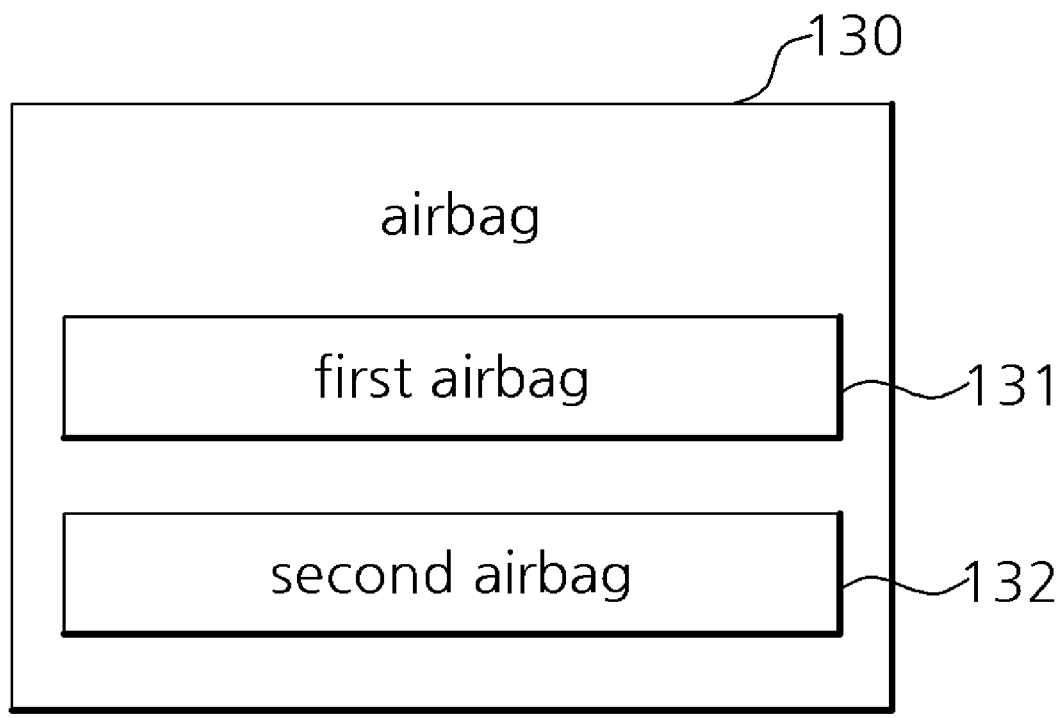
FIG. 4 is a functional block diagram showing a configuration of an airbag of the life protection device system according to the exemplary embodiment of the present invention.
Figure 5:
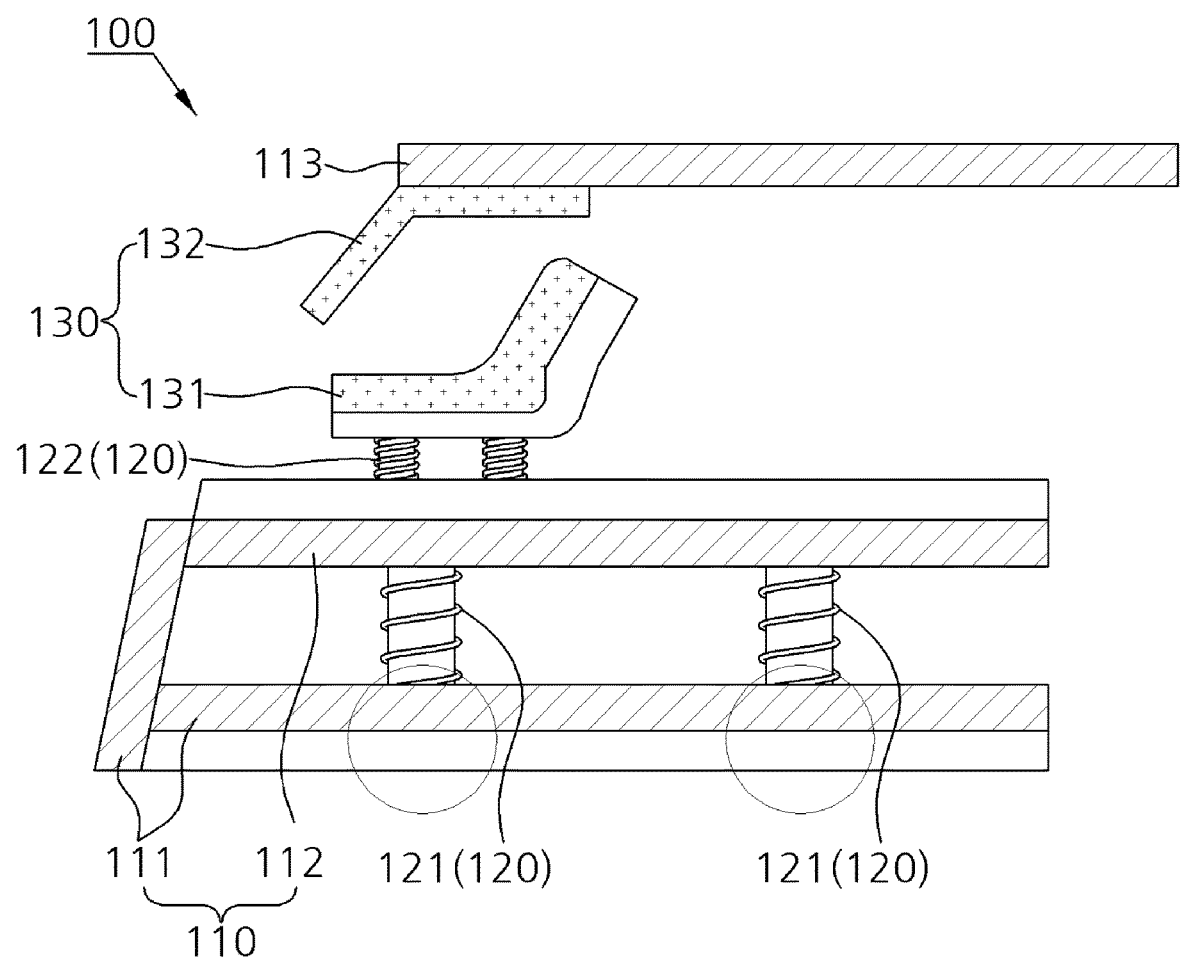
FIG. 5 is a view schematically showing an installation configuration of the shock absorbing device of the life protection device system according to the exemplary embodiment of the present invention.

FIG. 1 is a functional block diagram showing a configuration of a life protection device system according to an exemplary embodiment of the present invention, FIG. 2 is a functional block diagram showing a configuration of a shock absorbing part of the life protection device system according to the exemplary embodiment of the present invention, FIG. 3 is a functional block diagram showing a configuration of a shock absorber of the life protection device system according to the exemplary embodiment of the present invention, FIG. 4 is a functional block diagram showing a configuration of an airbag of the life protection device system according to the exemplary embodiment of the present invention, and FIG. 5 is a view schematically showing an installation configuration of the shock absorbing device of the life protection device system according to the exemplary embodiment of the present invention. As shown in FIGS. 1 to 5, the life protection device system 10 according to the exemplary embodiment of the present invention includes: a shock absorbing device 100, a measuring device 200, a controller 300, and an artificial intelligence part 400.

The shock absorbing device 100 is configured to include: a shock absorbing part 110, a shock absorber 120, and an airbag 130 that are mounted on a moving object so as to absorb impact to protect the life of passengers when the moving object crashes or collides. The shock absorbing device 100 may maximally reduce the occurrence of a problem wherein the life of passengers is not protected because, when the moving object crashes or collides, or falls into a river or sea, protection of the life of passengers by a conventional airbag or parachute in the event of an emergency situation is unsatisfactory, or in case where the time is insufficient for the parachute to be deployed, the moving object ends up sinking into the water. Here, it may be understood that the moving object includes a drone, an autonomous aircraft, and an autonomous vehicle. That is, the shock absorbing device 100 may perform a function to reduce shock on the moving object such as the drone, the autonomous aircraft, and the autonomous vehicle, and to minimize damage caused by a disaster situation, thereby protecting the life of the passengers.

The shock absorbing part 110 of the shock absorbing device 100, as shown in FIGS. 1 and 5, respectively, includes: a first shock absorbing part 111 mounted on a wheel support and a front bumper (not shown) of the moving object; a second shock absorbing part 112 mounted on a side and a floor of the moving object; and a third shock absorbing part 113 mounted on a roof top of the moving object. The first to third shock absorbing parts 111, 112, and 113 of the shock absorbing part 110 may be made of a shock absorbing material using an aerogel or a new material. Here, the second shock absorbing part 112 may perform a function as an air tube that allows the moving object to float with buoyancy when the moving object falls on the surface of a river or sea.

That is, it may be understood that the second shock absorbing part 112 is equipped with an air tube or a shock absorbing material made of a new material or an aerogel.

The shock absorber 120 of the shock absorbing device 100, as shown in FIGS. 3 and 5, respectively, may include: a first shock absorber 121 mounted for absorbing the shock between the floor of the moving object and the wheel support thereof or between the floor of the moving object and the front bumper (not shown) thereof; and a second shock absorber 122 mounted for absorbing the shock between the floor of the moving object and the seat thereof. As shown in FIG. 5, the first shock absorber 121 and the second shock absorber 122 may be provided with elastic spring members.

The airbag 130 of the shock absorbing device 100, as shown in FIGS. 4 and 5, respectively, may include: a first airbag 131 mounted on a framework of the seat of the moving object, and a second airbag 132 mounted at a position on a front and upper part of the seat of the moving object. Here, the measuring device 200 detects a preset number of times shock is applied to the moving object and then the first airbag 131 may be operated depending on the driving control signal generated by the controller 300.

The measuring device 200 is configured to detect the shock applied to the moving object. The measuring device 200 is configured to operate the first airbag 131 mounted on the framework of the seat on which the passenger of the moving object is seated.

The controller 300 is configured to generate the preset driving control signal according to the shock detected by the measuring device 200. The controller 300 operates the first airbag 131 mounted on the framework of the seat on which the passenger of the moving object is seated, but may output the driving control signal for operation of the first airbag 131 in the case where the shock detected by the measuring device 200 is detected more number of times than the preset number of times.

The artificial intelligence part 400 is configured to perform notifying of an occurrence of a disaster to a designated disaster center and ask for help therefrom in response to the driving control signal of the controller 300. When the moving object is safely operated, the artificial intelligence part 400 may control autonomous driving or autonomous flight through a function of mutually avoiding collision between the moving objects such as a drone, an autonomous aircraft, and an autonomous vehicle. In addition, the artificial intelligence part 400 may perform functions of notifying of the occurrence of a disaster and placing a help call to the designated disaster center through a wireless communication network, regarding an emergency situation of passengers in the event of a crash or collision of the moving object, and may further perform a function of notifying of the degree of passenger's injury.

Figure 6:
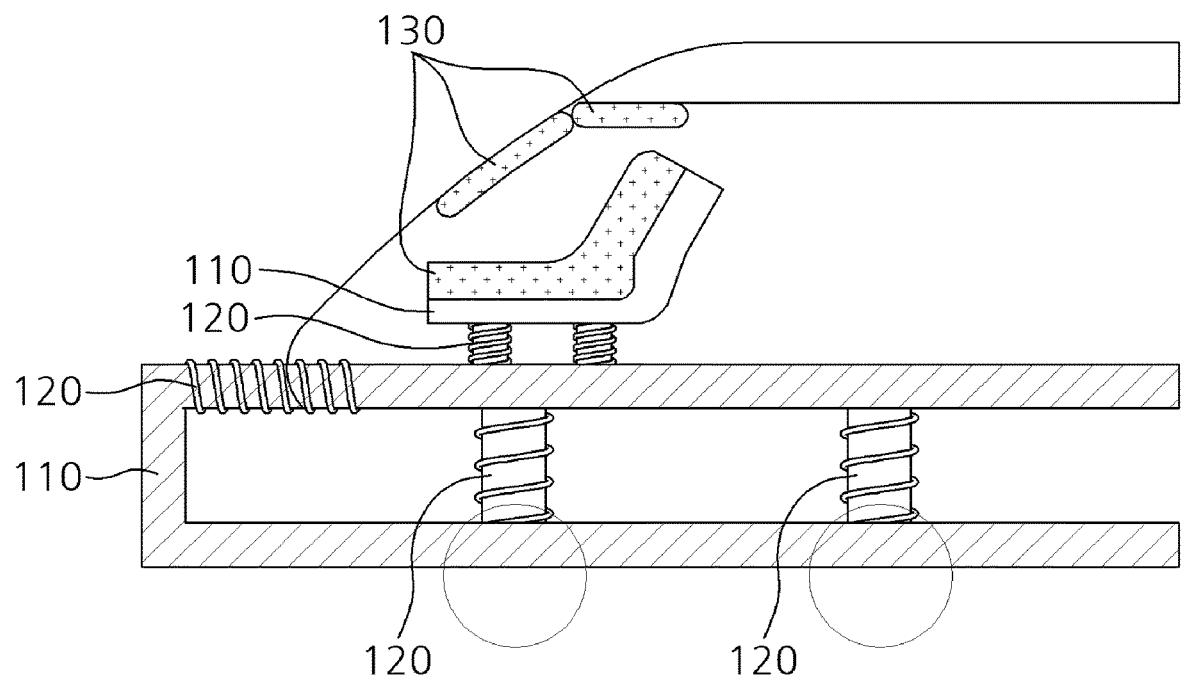
FIG. 6 is a view schematically showing another example of an installation configuration of the shock absorbing device of the life protection device system according to the exemplary embodiment of the present invention.

FIG. 6 is a view schematically showing another example of an installation configuration of the shock absorbing device of the life protection device system according to the exemplary embodiment of the present invention. The shock absorbing device 100 shown in FIG. 6 is provided with the same or similar configuration as that of the shock absorbing device 100 shown in FIG. 5, but is different only in the installation variations in some configurations, wherein the shock absorbing part 110 made of a shock absorbing material using an aerogel or a new material is mounted on a mat under the seat, and the shock absorbers 120 for absorbing shock are mounted at positions on the wheel support and a front part of the moving object.

As described above, the life protection device system according to the exemplary embodiment of the present invention includes: a shock absorbing device provided with a shock absorbing part, a shock absorber, and an airbag that are mounted on a moving object so as to absorb the impact to protect the life of passengers in the event of a crash or collision of the moving object; a measuring device detecting the shock applied to the moving object; a controller generating a preset driving control signal according to the detected shock of the measuring device; and an artificial intelligence part notifying of an occurrence of a disaster and asking for help from a designated disaster center in response to the driving control signal of the controller, wherein the impact on the passengers of the moving object is minimized even when the moving object such as a drone, an autonomous aircraft, and an autonomous vehicle crashes or collides, or falls into a river or sea, thereby protecting the life of the passengers in the emergency situation. In addition, by mounting the shock absorbing device including the shock absorbing part, shock absorber, airbag, and others on the moving object for autonomous driving, injury of the passengers is minimized through performing systematic and comprehensive step-by-step shock absorption even when the moving object crashes or collides, or falls into a river or sea; a notification is sent simultaneously to ask for help from a disaster center in the event of the emergency situation; and accordingly emergency rescue is performed.

The present invention described above can be modified or applied in various ways by those skilled in the art to which the present invention pertains. The scope of the technical idea according to the present invention should be defined by the following claims.

What is claimed is:
1. A life protection device system (10) comprising:
   a shock absorbing device (100) provided with a shock absorbing part (110), a shock absorber (120), and an airbag (130) that are mounted on a moving object so as to absorb impact to protect the life of passengers in an event of a crash or a collision of the moving object;
   a measuring device (200) detecting a shock applied to the moving object;
   a controller (300) generating a preset driving control signal according to the detected shock of the measuring device (200); and
   an artificial intelligence part (400) notifying of an occurrence of a disaster and asking for help from a designated disaster center in response to the driving control signal of the controller (300),
   wherein
   the shock absorbing part (110) comprises:
   a first shock absorbing part (111) mounted to a front bumper and to a lower portion of a wheel support of the moving object;
   a second shock absorbing part (112) mounted between an upper portion of the wheel support and a lower portion of a cabin floor of the moving object; and
   a third shock absorbing part (113) mounted to a roof top of the moving object,
   the shock absorber (120) comprises:
   a first shock absorber (121) mounted on the wheel support, wherein the first shock absorber (121) is located on a lower portion of the second shock absorbing part (112) and an upper portion of the first shock absorbing part (111) mounted to the lower portion of the wheel support of the moving object; and a second shock absorber (122) mounted on a lower portion of a seat and an upper portion of the cabin floor of the moving object, and the moving object is one selected from the group consisting of a drone, an autonomous aircraft, and an autonomous vehicle.

2. The life protection device system of claim 1, wherein the second shock absorbing part (112) performs a function as an air tube that allows the moving object to float with buoyancy when the moving object falls on the surface of a river or sea.

3. The life protection device system of claim 1, wherein the airbag (130) comprises:

a first airbag (131) mounted on an upper portion of the seat of the moving object; and a second airbag (132) mounted at a position on a front and lower portion of the roof of the moving object.

4. The life protection device system of claim 3, wherein the first airbag (131) is configured such that the first airbag (131) is operated according to the driving control signal generated by the controller (300) when the measuring device (200) detects a preset number of times of the shock.

5. The life protection device system of claim 1, wherein the artificial intelligence part (400) controls autonomous driving or autonomous flight through a function of mutually avoiding a collision between the moving objects including the drone, the autonomous aircraft, and the autonomous vehicle.

* * * * *